United States Patent
Oishi

(10) Patent No.: US 9,236,780 B2
(45) Date of Patent: Jan. 12, 2016

(54) ROTARY ACTUATOR WITH LINED BEARING HOLDER

(71) Applicant: DENSO CORPORATION, Kariya, Aichi-pref. (JP)

(72) Inventor: Kenichi Oishi, Obu (JP)

(73) Assignee: DENSO CORPORATION, Kariya (JP)

( * ) Notice: Subject to any disclaimer, the term of this patent is extended or adjusted under 35 U.S.C. 154(b) by 158 days.

(21) Appl. No.: 13/707,676

(22) Filed: Dec. 7, 2012

(65) Prior Publication Data

US 2013/0193812 A1 Aug. 1, 2013

(30) Foreign Application Priority Data

Jan. 26, 2012 (JP) .................................. 2012-13920

(51) Int. Cl.
| | |
|---|---|
| *H02K 7/08* | (2006.01) |
| *H02K 5/16* | (2006.01) |
| *H02K 29/08* | (2006.01) |
| *H02K 5/173* | (2006.01) |
| *H02K 7/116* | (2006.01) |
| *F16C 35/077* | (2006.01) |
| *F16C 35/12* | (2006.01) |
| *H02K 11/00* | (2006.01) |

(52) U.S. Cl.
CPC ................ *H02K 7/08* (2013.01); *F16C 35/077* (2013.01); *F16C 35/12* (2013.01); *H02K 5/16* (2013.01); *H02K 5/163* (2013.01); *H02K 5/165* (2013.01); *H02K 5/1732* (2013.01); *H02K 7/088* (2013.01); *H02K 7/116* (2013.01); *H02K 29/08* (2013.01); *H02K 7/083* (2013.01); *H02K 11/0021* (2013.01)

(58) Field of Classification Search
CPC ..... H02K 7/116; H02K 7/08; H02K 11/0021; H02K 5/16; H02K 5/161; H02K 5/163; H02K 5/165; H02K 5/15; H02K 5/173
USPC ........................ 310/90, 68 B, 216.075, 83, 99
See application file for complete search history.

(56) References Cited

U.S. PATENT DOCUMENTS

| | | | | |
|---|---|---|---|---|
| 4,746,231 | A * | 5/1988 | Hoshino | ........................ 384/537 |
| 6,574,076 | B1 * | 6/2003 | Koyama | ..................... 360/265.3 |

(Continued)

FOREIGN PATENT DOCUMENTS

| | | |
|---|---|---|
| JP | 2009-177982 A | 8/2009 |
| WO | WO 2006111657 A1 * | 10/2006 |
| WO | WO 2011030536 A1 * | 3/2011 |

OTHER PUBLICATIONS

Hasegawa, Takehiko; Watanabe, Akihiko; Mizukami, Hirofumi; Kado, Haruhiko; Kondo, Genki, Electric Motor and Electric Device Provided Therewith (English Translation), Mar. 17, 2011, Panasonic Corporation, WO 2011030536, PCT/JP2010005481.*

(Continued)

*Primary Examiner* — Terrance Kenerly
*Assistant Examiner* — Alexander Singh

(57) ABSTRACT

An inner ring of a bearing is affixed to an end of the rotor spindle and is immovable relative to the rotor spindle in the axial direction. An outer ring of the bearing is located radially outside of the inner ring via a roller body. An outer ring affixed portion is integrally affixed to the outer ring and is immovable relative to the outer ring in the axial direction. An inner ring receiving portion is located between the inner ring and a bottom portion of a housing and is in contact with the inner ring.

19 Claims, 10 Drawing Sheets

(56) References Cited

U.S. PATENT DOCUMENTS

| | | | |
|---|---|---|---|
| 7,354,371 B2* | 4/2008 | Hazama et al. | 475/149 |
| 2007/0145839 A1* | 6/2007 | Kimura et al. | 310/68 B |
| 2007/0205680 A1* | 9/2007 | Miyoshi et al. | 310/90 |
| 2007/0210658 A1* | 9/2007 | Terauchi et al. | 310/68 B |
| 2009/0189468 A1* | 7/2009 | Kume et al. | 310/83 |
| 2010/0170355 A1* | 7/2010 | Kume et al. | 74/63 |
| 2011/0253500 A1* | 10/2011 | Davis et al. | 192/110 B |

OTHER PUBLICATIONS

Hasegawa, Takehiko; Watanabe, Akehiko; Mizukami, Hirofumi; Kado, Haruhiko; Kondo, Genki, Electric Motor and Electric Device Provided Therewith, Panasonic Corporation, WO 2011030536, Mar. 17, 2011.*

Perillat, James; Chaudier, Bernard; Nicot, Christophe, Alternator Comprising an Antifriction Bearing Having a Fastening Collar, WO 2006111657, Oct. 26, 2006.*

* cited by examiner

<u>PRIOR ART</u>

ROTARY ACTUATOR WITH LINED BEARING HOLDER

CROSS REFERENCE TO RELATED APPLICATION

This application is based on reference Japanese Patent Application No. 2012-13920 filed on Jan. 26, 2012, the disclosure of which is incorporated herein by reference.

TECHNICAL FIELD

The present disclosure relates to a rotary actuator.

BACKGROUND

Conventionally, a rotary actuator is employed as a driver device for a mechanism such as a shift-by-wire system. For example, Patent Document 1 discloses a rotary actuator including a motor accommodated in a housing formed of a resin material. More specifically, the motor includes a rotor spindle rotatably supported by a first bearing, which is equipped to a rear housing, and a second bearing, which is equipped to an output shaft. The output shaft is rotatably supported by a bush, which is equipped to a front housing. The first bearing is fitted to the rear housing such that the first bearing is movable in the axial direction. The second bearing is fitted to the output shaft such that the second bearing is movable in the axial direction. Therefore, the rotor spindle is movable in the axial direction by a gap between the first bearings and the rear housing in the axial direction and a gap between the second bearings and the output shaft in the axial direction.

A rotation angle detection unit is equipped between a rotor core and the rear housing for detecting the rotation angle of the rotor core relative to the rear housing. The rotation angle detection unit includes a magnet and a magnetic sensor. The magnet is in an annular shape and is fixed to the rotor core. The magnetic sensor is fixed to the rear housing to form a gap with the magnet in the axial direction. The magnetic sensor receives magnetic field caused by the magnet and sends a pulse signal in synchronization with rotation of the rotor core.

The gap formed between the magnet and the magnetic sensor varies among products, due to an accumulated error in dimensions (axial dimensions) of multiple components of the rotary actuator in the axial direction. The variation in the gap coincides with accumulation of dimensional tolerances in (1) the axial dimension of the magnetic sensor, (2) the axial dimension between a magnetic sensor mount surface of the rear housing and an opening end surface of the rear housing, (3) the axial dimension between an opening end surface of the front housing and a bush contact surface of the front housing, (4) the axial dimension of a collar portion of the bush, (5) the axial dimension between a bush contact surface of the output shaft and a second bearing contact surface of the output shaft, (6) the axial dimension of the second bearing, (7) the axial dimension of a second bearing contact surface of the rotor spindle and a rotor core contact surface of the rotor spindle, and (8) the axial dimension of the magnet.

The rear housing, the front housing, the bush, the output shaft, the second bearing, and the rotor spindle are designed, such that variation in the gap is reduced as much as possible, and such that the magnet does not make contact with the magnetic sensor when the rotor spindle moves most closely to the first bearing. The dimensions of these components are determined in consideration that the rotor spindle is movable by a predetermined length in the axial direction and that the gap between the magnet and the magnetic sensor varies among products.

[Patent Document 1] Publication of Japanese unexamined patent application 2009-177982

In the rotary actuator disclosed in Patent Document 1, the gap needs to be secured enough in order to prevent the magnet from making contact with the magnetic sensor when the rotor spindle moves most closely to the first bearing, in a case where the variation in the gap between the magnet and the magnetic sensor is the smallest. Therefore, in the configuration of Patent Document 1, magnetism applied from the magnet to the magnetic sensor may be insufficient.

Furthermore, in the configuration of Patent Document 1, the gap largely varies, since the rotor spindle and the magnet are movable by a large length in the axial direction. Therefore, the magnetism applied from the magnet to the magnetic sensor may be unstable.

SUMMARY

It is an object of the present disclosure to produce a rotary actuator configured to secure magnetism applied from the magnet to the magnetic sensor and to stabilize the magnetism.

According to an aspect of the present disclosure, a rotary actuator comprises a rotor spindle being rotatable. The rotary actuator further comprises a rotor core being rotatable integrally with the rotor spindle. The rotary actuator further comprises a stator configured to apply a magnetism to the rotor core to rotate the rotor core. The rotary actuator further comprises a housing. The housing includes a tubular portion located radially outside of the rotor core and the stator. The housing further includes a first bottom portion surrounding one end of the tubular portion. The housing further includes a second bottom portion surrounding an other end of the tubular portion. The rotary actuator further comprises a magnet affixed to an end of the rotor core on a side of the first bottom portion and rotatable integrally with the rotor core. The rotary actuator further comprises a magnetic sensor affixed to the first bottom portion, such that the magnetic sensor forms a gap with the magnet in an axial direction. The magnetic sensor is configured to receive a magnetic field caused by the magnet and to send a pulse signal in synchronization with rotation of the rotor core. The rotary actuator further comprises a bearing configured to rotatably support the rotor spindle. The bearing includes an inner ring integrally affixed to a radially outer wall of an end of the rotor spindle on the side of the first bottom portion such that the inner ring is immovable relative to the rotor spindle in the axial direction. The bearing further includes an outer ring located radially outside of the inner ring. The bearing further includes a roller body located between the inner ring and the outer ring. The rotary actuator further comprises a bearing holder unit joined to the housing. The bearing holder unit is integrally formed with an outer ring affixed portion integrally affixed to a radially outer wall of the outer ring such that the outer ring affixed portion is immovable relative to the outer ring in the axial direction. The bearing holder unit is further integrally formed with an inner ring receiving portion located between the inner ring and the first bottom portion such that the inner ring receiving portion is in contact with the inner ring.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, multiple embodiments of the present disclosure will be described with reference to drawings.

First Embodiment

Figure 1:
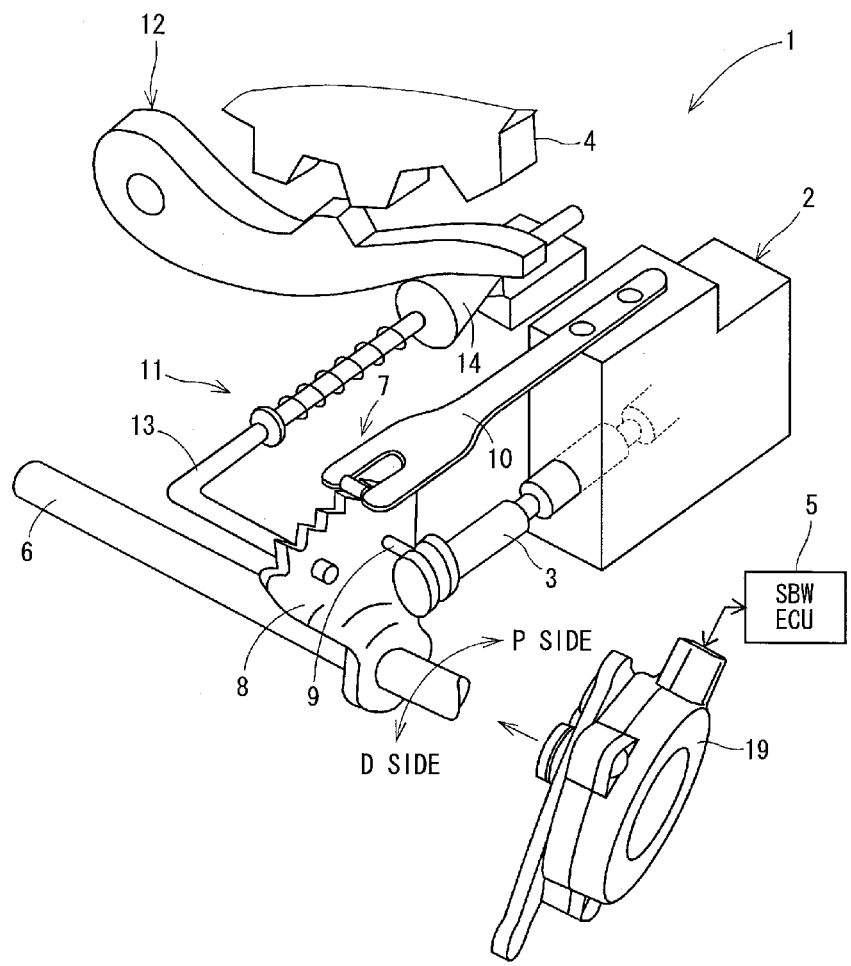
FIG. 1 is a perspective view showing a shift-by-wire system including a rotary actuator according to a first embodiment.

As shown in FIG. 1, a rotary actuator according to the first embodiment of the present disclosure is employed as an actuator of a shift-by-wire system. A shift-by-wire system 1 is configured to manipulate a manual valve 2 thereby to switch a shift range of a vehicular automatic transmission device. The shift-by-wire system 1 is further configured to regulate rotation of a parking gear 4 thereby to lock rotation of the automatic transmission device. First, the configuration of the shift-by-wire system 1 will be described as follows.

Referring to FIG. 1, the shift-by-wire system 1 includes an electronic control unit 5, a rotary actuator 19, a control rod 6, a detent mechanism 7, and a parking mechanism 11. The electronic control unit 5 manipulates the rotary actuator 19 according to a manipulated position of a selection lever (not shown) manipulated by a driver. The rotary actuator 19 rotates the control rod 6. The control rod 6 rotates integrally with an output shaft of the rotary actuator 19.

The detent mechanism 7 includes a detent plate 8 and a detent spring 10. The detent plate 8 rotates integrally with the control rod 6. The detent spring 10 fixes the rotary position of the detent plate 8. The detent plate 8 has an engaging projection 9 configured to be engaged with a valve element 3 of the manual valve 2 in the axial direction. The detent plate 8 moves the valve element 3 in the axial direction according to the rotary position of the detent plate 8. The present configuration enables the automatic transmission device to switch the shift range.

The parking mechanism 11 includes a parking lock pole 12, a park rod 13, and a cam member 14. The parking lock pole 12 is configured to move toward the parking gear 4 and move away from the parking gear 4. The park rod 13 moves in a direction parallel to the axial center of the parking gear 4 according to the rotary position of the detent plate 8. The cam member 14 moves the parking lock pole 12 toward the parking gear 4 and moves the parking lock pole 12 away from the parking gear 4 according to movement of the park rod 13. The cam member 14 moves the parking lock pole 12 to a position, at which the parking lock pole 12 is engaged with the parking gear 4, when the detent plate 8 rotates to a predetermined parking position. Thus, rotation of an output shaft (not shown) of the automatic transmission device, which rotates integrally with the parking gear 4, is locked.

Figure 2:
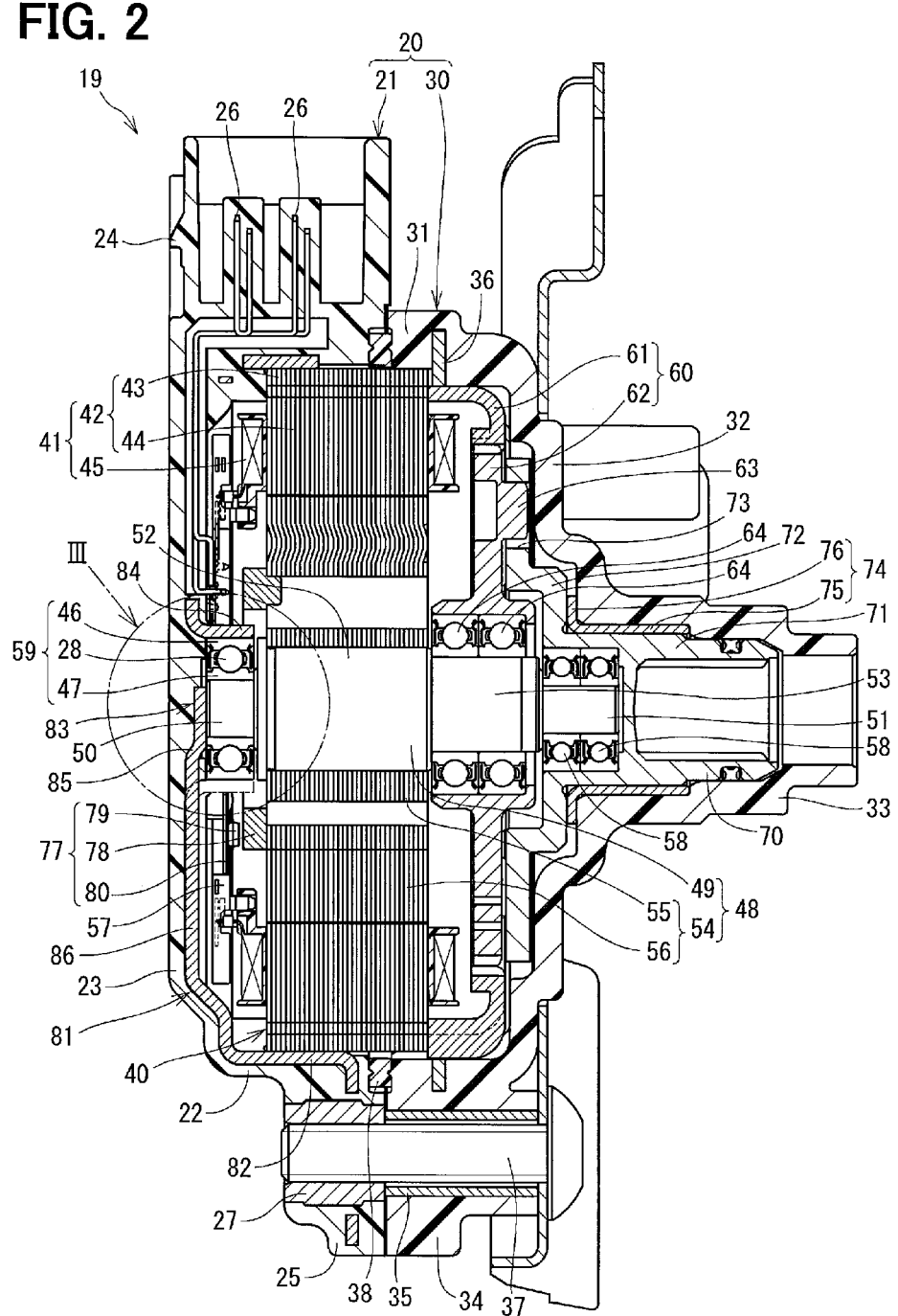
FIG. 2 is a sectional view showing the rotary actuator.
Figure 3:
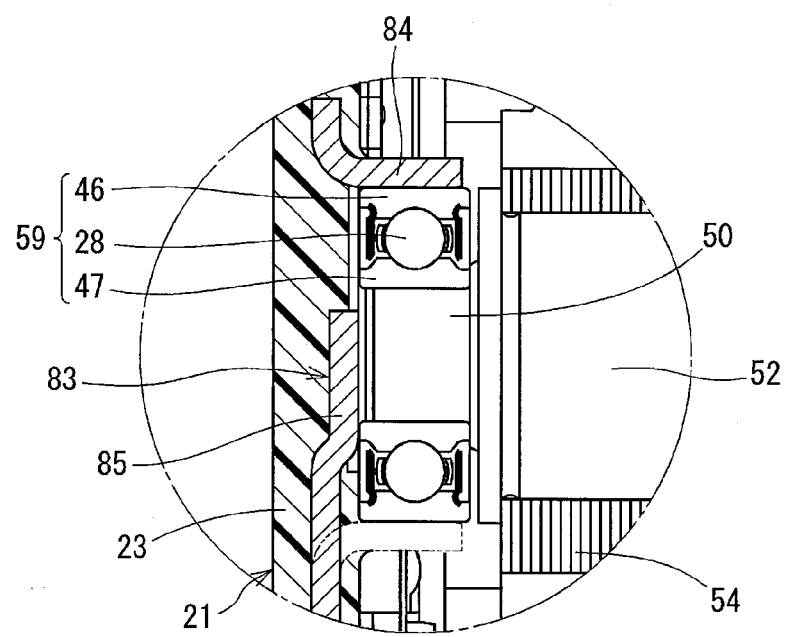
FIG. 3 is an enlarged view showing a section of the rotary actuator indicated by the circle III in FIG. 2.
Figure 4:
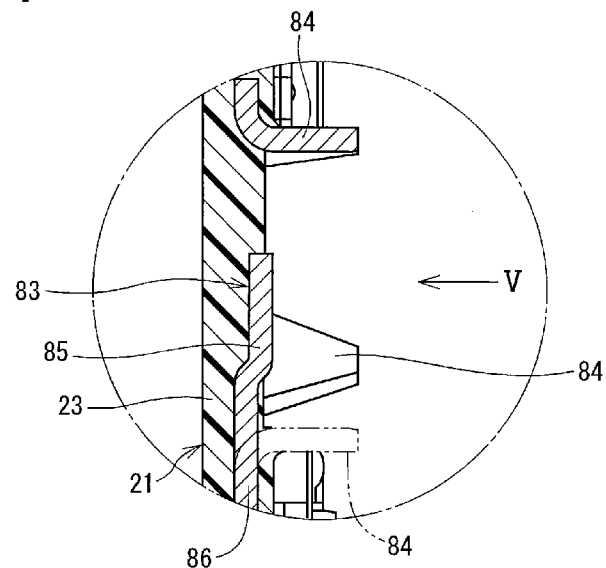
FIG. 4 is a sectional view showing the same portion of the rotary actuator as in FIG. 3, excluding a bearing.
Figure 5:
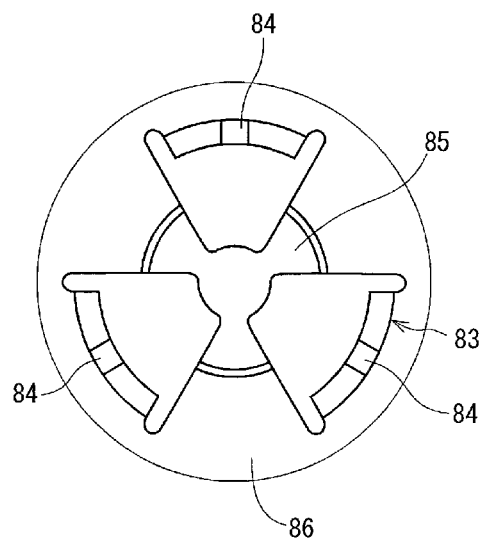
FIG. 5 is a view showing a bearing holder portion when being viewed along the arrow V in FIG. 4.

Next, the rotary actuator 19 will be described in detail with reference to FIG. 2. As shown in FIG. 2, the rotary actuator 19 includes a housing 20, a switched reluctance motor (SR motor) 40, a reduction gears 60, an output shaft 70, a rotary encoder 77, and the like. The housing 20 includes a rear housing 21 and a front housing 30.

The rear housing 21 is formed of a resin material. The rear housing 21 includes a tubular portion 22, a bottom portion 23, a connector portion 24, and multiple mount portions 25. The tubular portion 22 and the bottom portion 23 are embedded with a metallic plate 81, which is in a bottomed tubular shape. The tubular portion 22 and a tubular portion 31, which will be described later, may be equivalent to a tubular portion. The bottom portion 23 may be equivalent to a first bottom portion. The plate 81 will be described later in detail. The connector portion 24 accommodates multiple terminals 26, which are connectable with the electronic control unit 5 (FIG. 1). The mount portions 25 are projected radially outward from the tubular portion 22. The mount portions 25 are embedded with metallic insert nuts 27, respectively.

The front housing 30 is formed of a resin material. The front housing 30 includes the tubular portion 31, a bottom portion 32, an output unit 33, and multiple mount portions 34. The tubular portion 31 is coaxial with the tubular portion 22. The bottom portion 32 covers an end portion of the tubular portion 31 on the opposite side of the rear housing 21. The bottom portion 32 may be equivalent to a second bottom portion. The output unit 33 is in a tubular shape and projected from the center of the bottom portion 32 to the opposite side of the rear housing 21. The output unit 33 has a configuration to be inserted in a case (not shown) of the automatic transmission device. The mount portions 34 are projected radially outward from the tubular portion 31 at positions corresponding to the mount portions 25, respectively. The mount portions 34 are embedded with metallic insertion collars 35, respectively.

The front housing 30 is affixed to the rear housing 21 by using screws 37, such that the insert nuts 27 are in contact with the insertion collars 35, respectively. The screws 37 are screwed to the insert nuts 27 through the insertion collars 35, respectively. A sealing member 38 is equipped between an opening end surface of the front housing 30 and an opening end surface of the rear housing 21 to seal the interior of the housing 20.

The SR motor 40 is a three-phase brushless motor and includes a stator 41 and a rotor 48. The stator 41 includes a stator core 42 and multiple coils 45. The stator core 42 includes a ring portion 43 and multiple teeth portions 44. The ring portion 43 is fitted to the inner wall of a stator holder portion 82 of the plate 81. The multiple teeth portions 44 are projected radially inward from the ring portion 43. The teeth portions 44 are arranged in the circumferential direction at regular intervals. The number of the teeth portions 44 is, for example, twelve. The stator core 42 includes two or more annular plates laminated in the thickness direction.

The coils 45 include U-phase coils, V-phase coils, and W-phase coils, which are lead wires wound around the teeth portions 44, correspondingly. In the present example, the number of the coils in each phase is four. One of the U-phase coils, one of the V-phase coils, and one of the W-phase coils are arranged in order in the circumferential direction.

The coils 45 are electrically connected with a bus bar 57. The bus bar 57 is equipped around the inner wall of the bottom portion 23 of the rear housing 21. The bus bar 57 is formed of, for example, a thin metallic plate and is electrically connected with the terminals 26 of the connector portion 24. The coils 45 are supplied with electricity through the bus bar 57. The stator 41 switches the supply of electricity to the coils in each phase in order, thereby to cause a magnetic field, which rotates in the circumferential direction, to rotate the rotor 48.

The rotor 48 is located radially inside of the stator 41. The rotor 48 includes a rotor spindle 49 and a rotor core 54. The rotor spindle 49 is rotatably supported by a rear bearing 59 at one end 50 on the side of the rear housing 21. The rotor spindle 49 is further rotatably supported by a front bearing 58 at the other end 51 on the side of the front housing 30. The rear bearing 59 may be equivalent to a bearing.

The front bearing 58 includes a tubular inner ring 47, a tubular outer ring 46, and a roller body 28. The tubular inner ring 47 is integrally affixed to the outer circumferential periphery of the one end 50 such that the tubular inner ring 47 is immovable relative to the rotor spindle 49 in the axial direction. The tubular outer ring 46 is located on the radially outside of the inner ring 47. The roller body 28 is located between the inner ring 47 and the outer ring 46.

The rotor spindle 49 has a rotor core mount portion 52 and an eccentric portion 53, which are located between the one end 50 and the other end 51. The rotor core mount portion 52 and the eccentric portion 53 are arranged from the side of the one end 50 in this order. The one end 50, the rotor core mount portion 52, and the other end 51 are coaxial with each other. The eccentric portion 53 is eccentric relative to the rotor core mount portion 52.

The rotor core 54 includes a boss portion 55 and multiple salient poles 56. The boss portion 55 is press-fitted to the outer circumferential periphery of the rotor spindle 49. The multiple salient poles 56 are projected radially outward from the boss portion 55. The salient poles 56 are arranged in the circumferential direction at regular intervals. The number of the salient poles 56 is, for example, eight. The rotor core 54 includes two or more plates laminated in the thickness direction.

The reduction gears 60 form a planetary gear device and include a ring gear 61 and a sun gear 62. The ring gear 61 is an annular gear located on the radially outside of the eccentric portion 53 of the rotor spindle 49. The ring gear 61 is coaxial with the one end 50 and the other end 51 of the rotor spindle 49. A ring gear holder plate 36 is embedded in the tubular portion 31 of the front housing 30. The ring gear 61 is fitted to the radially inner wall of the ring gear holder plate 36 thereby affixed to the ring gear holder plate 36.

The sun gear 62 is located radially inside of the ring gear 61. The sun gear 62 is coaxial with the eccentric portion 53 of the rotor spindle 49. The sun gear 62 is an external gear meshed with the ring gear 61. The sun gear 62 is supported by a middle bearing 64 such that the sun gear 62 is configured to rotate around the eccentric portion 53 and to revolve (orbit) around the rotor core mount portion 52 of the rotor spindle 49.

The sun gear 62 has multiple torque-transmission projections 63 projected on the opposite side of the rotor core 54 for transmission of torque. The torque-transmission projections 63 are arranged around the rotation axis of the sun gear 62 at regular intervals. The torque-transmission projections 63 and torque-transmission holes 73, which will be described later, function as a rotation transmission unit for transmitting a rotation component of the sun gear 62 to the output shaft 70.

The output shaft 70 includes a shaft portion 71 and a flange portion 72. The shaft portion 71 is coaxial with the other end 51 of the rotor spindle 49. A tubular portion 75 of a bush 74 is equipped radially inside of the output unit 33 of the front housing 30. The shaft portion 71 is rotatably supported by the tubular portion 75.

The front bearing 58 is equipped to the radially inner wall of the shaft portion 71. The front bearing 58 is located on the side of the other end 51. The inner wall of the shaft portion 71 on the external side is formed with inner teeth extended in the axial direction. The control rod 6 (FIG. 1) is fitted to the radially inside of the shaft portion 71 and engaged with the inner teeth of the shaft portion 71, thereby connected with the shaft portion 71 to transmit rotary motion.

The flange portion 72 is extended radially outward from the end portion of the shaft portion 71 on the side of the sun gear 62. The flange portion 72 has the torque-transmission holes 73, which are loosely fitted with the torque-transmission projections 63 of the sun gear 62, respectively. The torque-transmission holes 73 are arranged at regular intervals around the rotor core mount portion 52 of the rotor spindle 49, i.e., around the revolution axis of the sun gear 62. The torque-transmission holes 73 and the torque-transmission projections 63 may be equivalent to a rotation transmission unit.

The front bearing 58 restricts the output shaft 70 from moving in the axial direction toward the sun gear 62. The bush 74 has a collar portion 76 located between the flange portion 72 and the bottom portion 32 of the front housing 30. The collar portion 76 restricts the output shaft 70 from moving outward in the axial direction.

The rotary encoder 77 includes a magnet 78, a hall IC device 79, a hall IC device (not shown), and an encoder board 80. In the following description, the hall IC device 79 and the hall IC device (not shown) are simply termed "hall IC device" when not distinguished specifically from each other. The hall IC device may be equivalent to a magnetic sensor.

The magnet 78 is an annular multi-pole magnet magnetized with N poles and S poles alternately in the circumferential direction. The magnet 78 is coaxial with the rotor core 54 and affixed integrally with an end of the rotor core 54 on the side of the rear housing 21. The hall IC device and the encoder board 80 are integrally affixed to the inner wall of the bottom portion 23 of the rear housing 21. The hall IC device and the magnet 78 form a gap therebetween in the axial direction. The hall IC device 79 is shifted by a predetermined angle relative to the hall IC device (not shown) in the circumferential direction.

The hall IC device includes a hall element and a signal conversion circuit. The hall element is a magnetoelectric conversion element configured to detect an intensity of a magnetic field by utilizing Hall effect. The hall element is configured to output an electric signal, which is in proportion to a magnetic flux density of a magnetic field caused by the magnet 78. The signal conversion circuit is configured to convert the output signal sent from the hall element into a digital signal. The hall IC device sends a pulse signal in synchronization with rotation of the rotor core 54. The A-phase pulse signal sent from the hall IC device 79 is shifted in phase relative to the B-phase pulse signal sent from the hall IC device (not shown) by, for example, ¼ cycle.

The encoder board 80 includes a circuit board equipped with the hall IC device. The encoder board 80 counts an edge of the A-phase pulse signal sent from the hall IC device 79 and an edge of the B-phase pulse signal sent from the hall IC device (not shown), thereby to detect the rotation angle and the rotative direction of the rotor core 54.

In the rotary actuator 19 configured as described above, the rotor 48 rotates in one rotative direction when electricity supplied to the coils 45 is switched in the order of the U-phase coil, the V-phase coil, and the W-phase coil. Alternatively, the rotor 48 rotates in the other rotative direction when electricity supplied to the coils 45 is switched in the order of the W-phase coil, the V-phase coil, and the U-phase coil. The rotor 48 rotates by 45 degrees at each time when electricity supply to the U-phase coil, the V-phase coil, and the W-phase coil is completed.

When the rotor 48 rotates, the sun gear 62 rolls along the inner wall of the ring gear 61 thereby to rotate relative to the eccentric portion 53 of the rotor spindle 49 and thereby to revolve relative to the rotor core mount portion 52 of the rotor spindle 49. In the present state, the sun gear 62 conducts speed reduction relative to the rotor spindle 49. When the sun gear 62 rotates, the rotation component of the sun gear 62 is transmitted through the torque-transmission projections 63 and the torque-transmission holes 73 to the output shaft 70. The output shaft 70 transmits the rotation to the control rod 6.

Subsequently, the configuration of the plate 81 will be described in detail with reference to FIGS. 2 to 5. The plate 81 includes the stator holder portion 82, a bearing holder portion 83, and a joint portion 86, which are integrally formed in one component. The stator holder portion 82 is in a tubular shape and is fitted to the outer wall of the stator core 42 on the radially outside. The bearing holder portion 83 is fitted to the outer wall of the rear bearing 59 on the radially outside. The joint portion 86 covers the end of the stator holder portion 82 on the side of the bottom portion 23 such that the joint portion 86 connects the stator holder portion 82 with the bearing holder portion 83. The stator holder portion 82 may be equivalent to a stator holder unit. The bearing holder portion 83 may be equivalent to a bearing holder unit. The joint portion 86 may be equivalent to a joint unit.

The bearing holder portion 83 includes an outer ring affixed portion 84 and an inner ring receiving portion 85. The outer ring affixed portion 84 includes three projections located at the radially outside of the outer ring 46 of the rear bearing 59. The three projections of the outer ring affixed portion 84 are projected from the joint portion 86 toward the rotor core 54. Each of the three projections is in a round shape extending along the radially outer surface of the outer ring 46. The radially outer wall of the outer ring 46 is press-fitted into the outer ring affixed portion 84. In this way, the outer ring 46 is integrated with the outer ring affixed portion 84, such that the outer ring 46 is immovable relative to the outer ring affixed portion 84 in the axial direction.

The inner ring receiving portion 85 is located between the inner ring 47 and the bottom portion 23. The inner ring receiving portion 85 protrudes from the joint portion 86 toward the inner ring 47. The inner ring 47 is in contact with the inner ring receiving portion 85. The outer ring 46 and the bottom portion 23 have a gap therebetween.

The plate 81, which includes the bearing holder portion 83, the stator holder portion 82, and the joint portion 86, is formed of a metallic material. The plate 81 is formed by, for example, implementing a press working on a metallic plate. The plate 81 may be further insert-molded of a resin material together with the insert nuts 27 to be integrally molded with the rear housing 21.

Figure 6:
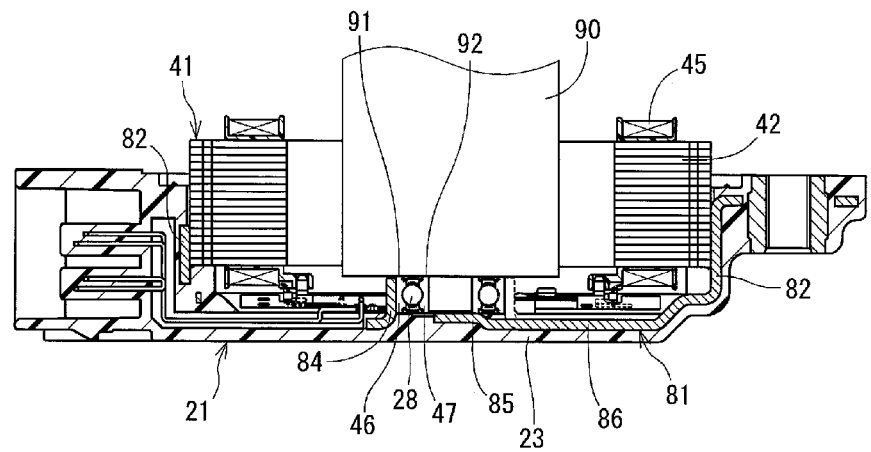
FIG. 6 is a sectional view showing a manufacturing process of the rotary actuator to equip a rear bearing to a bearing holder portion of a plate.

As shown in FIG. 6, the rear bearing 59 is press-fitted into the outer ring affixed portion 84 by using a press-fitting punch 90. In the present press-fitting process, the press-fitting punch 90 urges simultaneously a first pressed surface 91 of the outer ring 46 and a second pressed surface 92 of the inner ring 47. The first pressed surface 91 and the second pressed surface 92 are at the same level in the axial direction. Therefore, the press-fitting punch 90 is enabled to cause its single flat surface to press the outer ring 46 and the inner ring 47. The inner ring receiving portion 85 functions as an axial support of the inner ring 47 when the outer ring 46 is press-fitted into the outer ring affixed portion 84.

Figure 7:
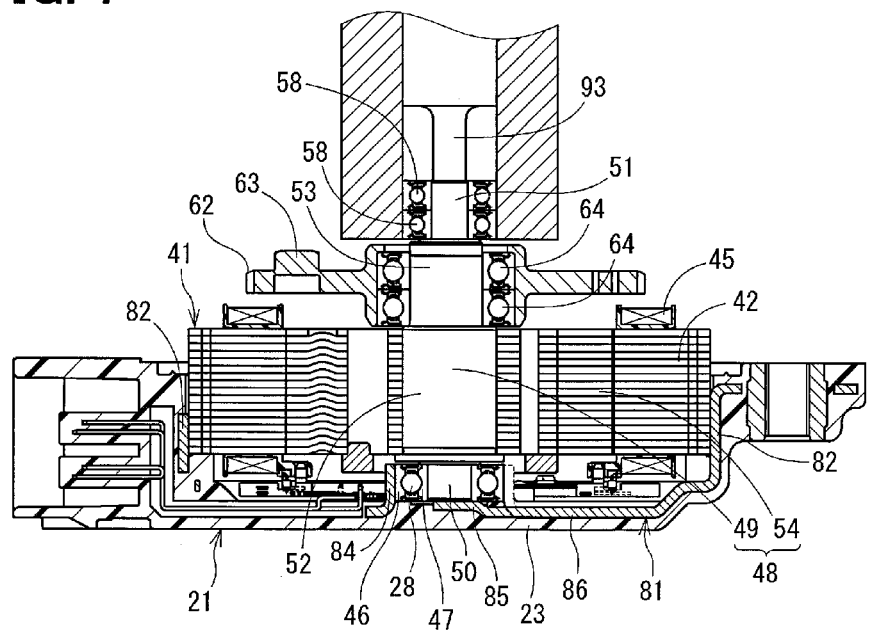
FIG. 7 is a sectional view showing a manufacturing process of the rotary actuator to equip a rotor spindle to an inner ring of the rear bearing.

As shown in FIG. 7, the rotor spindle 49 is press-fitted into the inner ring 47 of the rear bearing 59 by using a press-fitting punch 93. The inner ring receiving portion 85 functions as an axial support of the inner ring 47 when the rotor spindle 49 is press-fitted into the inner ring 47.

As described above, the rotary actuator 19 according to the first embodiment includes the rotor spindle 49, which is press-fitted into the inner ring 47 of the rear bearing 59 at the one end 50, and thereby integrally affixed to the inner ring 47, such that the rotor spindle 49 is immovable in the axial direction. The outer ring 46 is press-fitted into the outer ring affixed portion 84, and thereby integrally affixed to be immovable in the axial direction relative to the outer ring affixed portion 84. The bearing holder portion 83 of the plate 81 is integrally formed with the outer ring affixed portion 84 and the inner ring receiving portion 85 and is joined with the rear housing 21. The inner ring receiving portion 85 is located between the inner ring 47 and the bottom portion 23 and is in contact with the inner ring 47.

Figure 8:
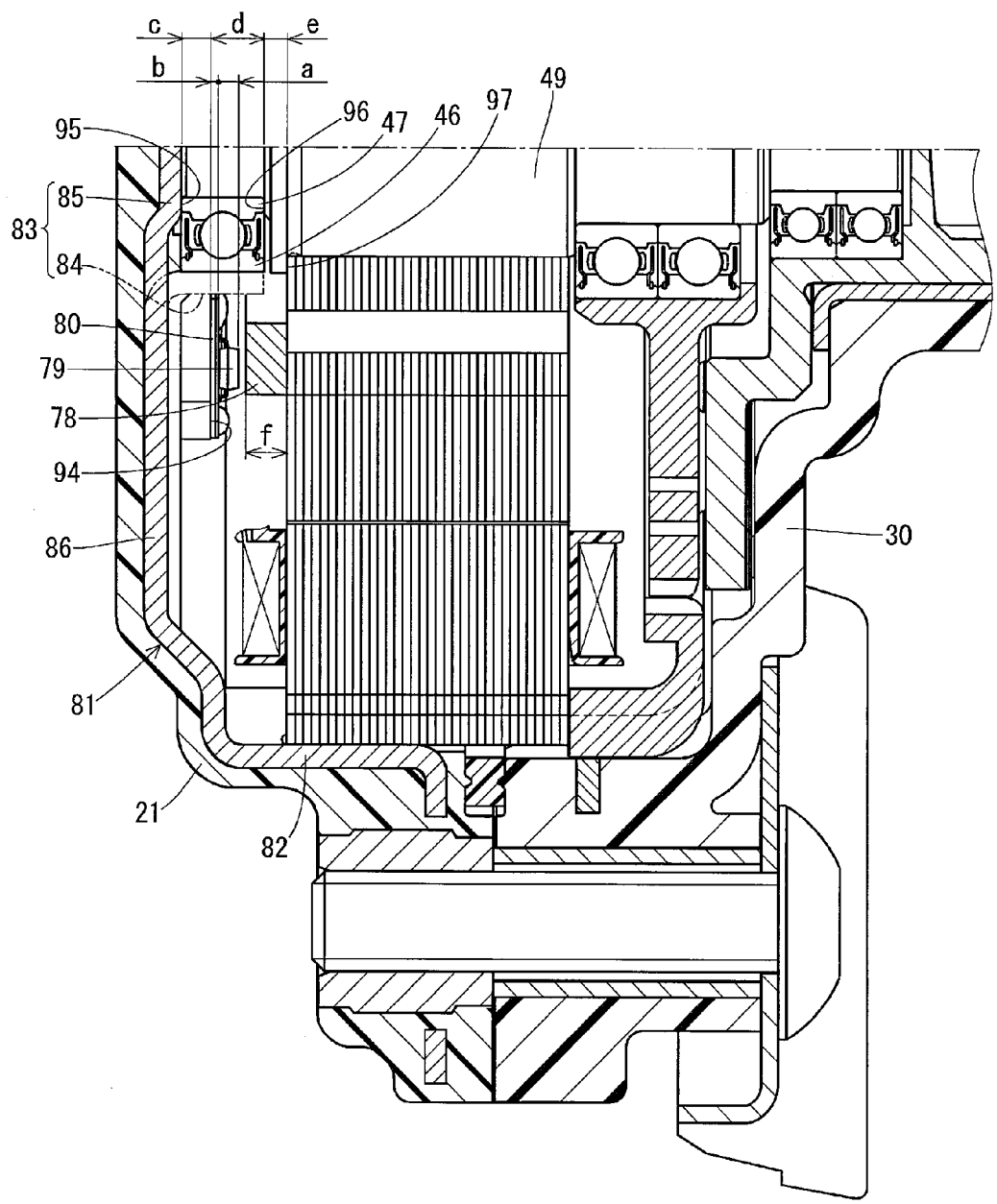
FIG. 8 is a sectional view showing a variation in a gap between the magnet and a hall IC device in the rotary actuator.

Therefore, a variation in the gap between the magnet 78 and the hall IC device 79 coincides with an accumulation of the dimensional tolerances in the dimensions a to f in the axial direction, as shown in FIG. 8. Specifically, the dimensions a to f include (1) the axial dimension a of the hall IC device 79, (2) the axial dimension b of the circuit board of the encoder board 80, (3) the axial dimension c between a circuit board mount surface 94 of the rear housing 21 and an inner ring receiving surface 95 of the inner ring receiving portion 85 of the bearing holder portion 83, (4) the axial dimension d of the inner ring 47 of the rear bearing 59, (5) the axial dimension e between an inner ring contact surface 96 of the rotor spindle 49 and a rotor core contact surface 97 of the rotor spindle 49, and (6) the axial dimension f of the magnet 78.

Figure 9A:
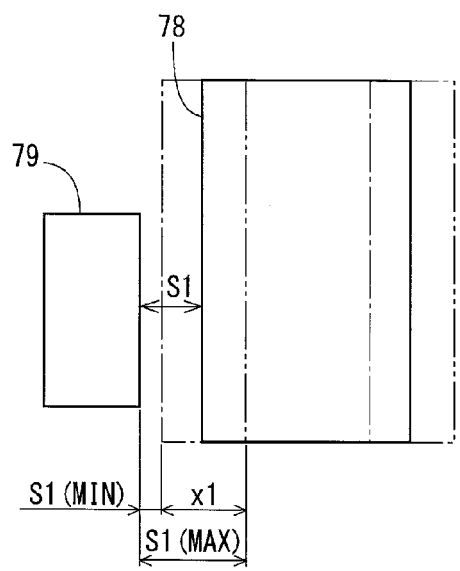
FIG. 9A is a view showing a variation in the gap between the magnet and the hall IC device in the rotary actuator of the present disclosure.
Figure 9B:
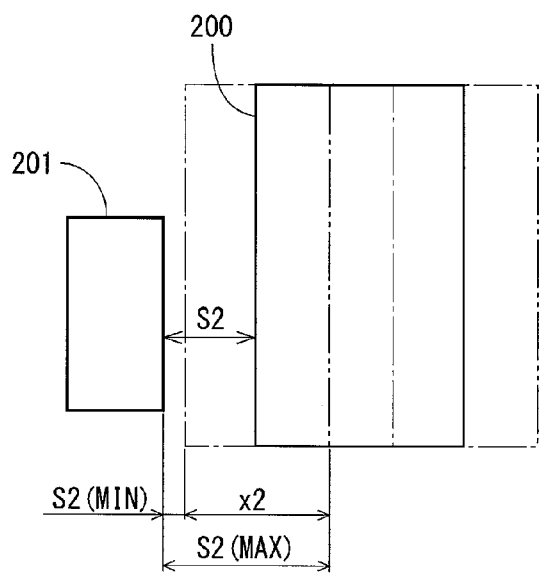
FIG. 9B is a view showing a variation in a gap between a magnet and a hall IC device in a conventional rotary actuator.

Therefore, the variation x1 of the gap S1 between the magnet 78 and the hall IC device 79 of the rotary actuator 19 shown in FIG. 9A is smaller than the variation x2 of the gap S2 of the conventional configuration shown in FIG. 9B. Therefore, by setting the gap S1 (MIN) in the rotary actuator 19, in a case where the variation x1 is the minimum, at the gap S2 (MIN) in the conventional rotary actuator, in a case where the variation x2 is the minimum, the gap S1 between the magnet 78 and the hall IC device 79 can be reduced. In particular, the gap S1 (MAX), in a case where the variation X1 in the rotary actuator 19 is the maximum, is significantly smaller than the gap S2 (MAX) in the conventional rotary actuator, in a case where the variation x2 is the maximum. Therefore, the magnetism applied from the magnet 78 to the hall IC device 79 can be enhanced.

Figure 13:
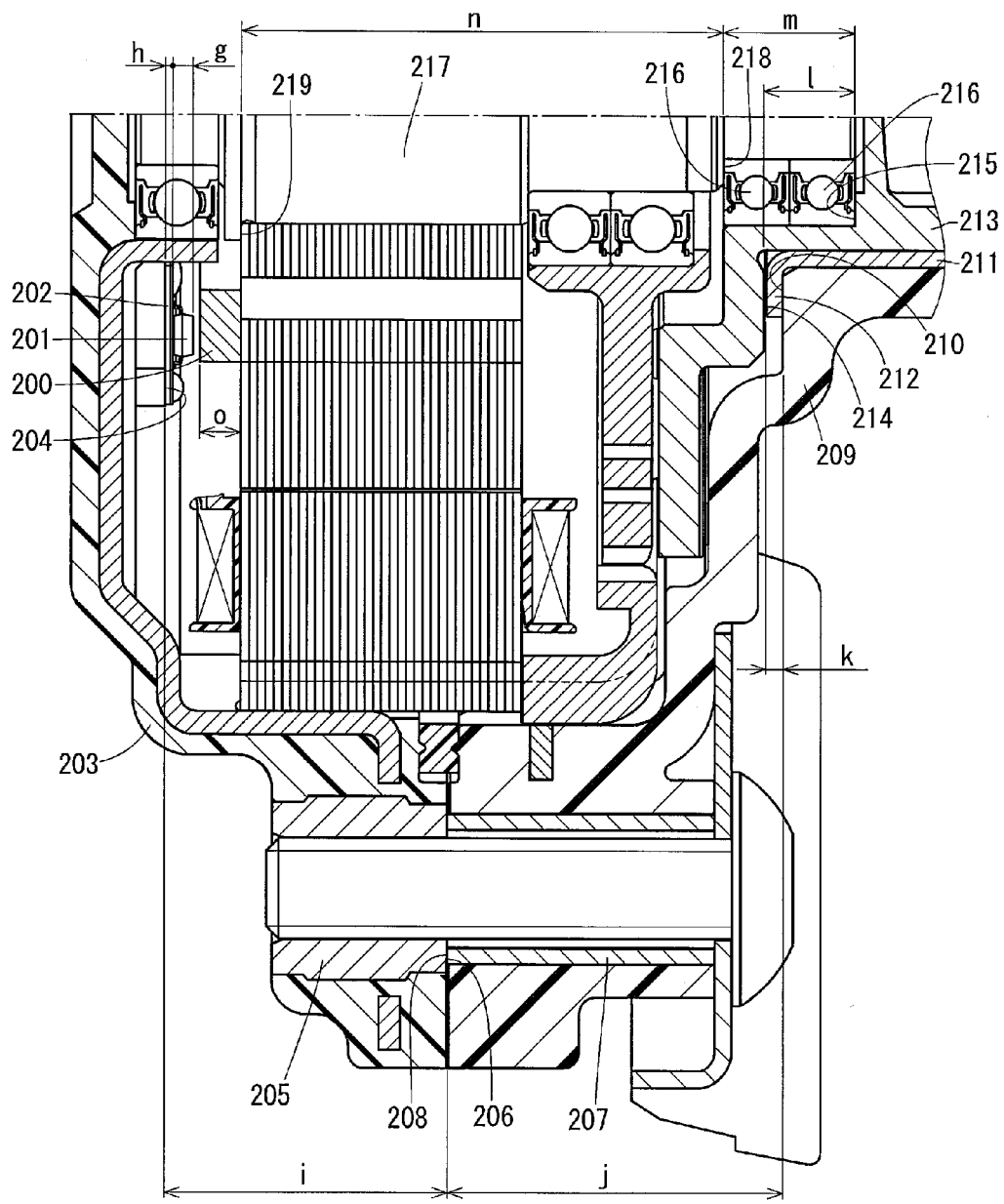
FIG. 13 is a sectional view showing a variation in the gap between the magnet and the hall IC device in the conventional rotary actuator.

In the conventional rotary actuator, as shown in FIG. 13, the variation in the gap between a magnet 200 and a hall IC device 201, coincides with an accumulation of the dimensional tolerances of the following axial dimensions g to o. (1)

the axial dimension g of the hall IC device 201, (2) the axial dimension h of the circuit board of an encoder board 202, (3) the axial dimension i between a circuit board mount surface 204 of a rear housing 203 and a combination surface 206 of an insert nut 205, (4) the axial dimension j between a combination surface 208 of an insertion collar 207 and a bush contact surface 210 of a front housing 209, (5) the axial dimension k of a collar portion 212 of a bush 211, (6) the axial dimension I between a bush contact surface 214 of an output shaft 213 and a bearing contact surface 215 of the output shaft 213, (7) the axial dimension m of the two front bearings 216, (8) the axial dimension n between a bearing contact surface 218 of a rotor spindle 217 and a rotor core contact surface 219 of the rotor spindle 217, and (9) the axial dimension o of the magnet 200. In the conventional rotary actuator, the number of the accumulations of the dimensional tolerances is greater than that of the rotary actuator 19, and therefore, the variation x2 in the gap S2 is larger than the variation in the rotary actuator 19.

It is noted that, according to the first embodiment, movement of the rotor spindle 49 in the axial direction is restricted within the length of a minute thrust backlash caused among the components of the rear bearing 59, such as the roller body 28, the inner ring 47, and the outer ring 46. Therefore, the magnetism applied from the magnet 78 to the hall IC device 79 can be stabilized. In addition, according to the first embodiment, the bearing holder portion 83 of the plate 81 is integrally connected to the stator holder portion 82 via the joint portion 86. Therefore, rigidity of the bearing holder portion 83 can be enhanced.

In addition, according to the first embodiment, the plate 81, which includes the bearing holder portion 83, the stator holder portion 82, and the joint portion 86, is formed of a metallic material. The plate 81 is formed by, for example, implementing a press working on a metallic plate. The plate 81 may be further insert-molded of a resin material together with the insert nuts 27 to be integrally molded with the rear housing 21. Therefore, the bearing holder portion 83 can be easily joined to the rear housing 21. In addition, when the outer ring 46 is press-fitted to the outer ring affixed portion 84, the inner ring receiving portion 85, which is formed of a metallic material, receives the load caused by the press-fitting. Therefore, the rear housing 21 can be restricted from deforming due to the press-fitting load applied thereto.

According to the first embodiment, the outer ring 46 and the bottom portion 23 have the gap therebetween. In addition, the outer ring 46 has the first pressed surface 91 on the side of the bottom portion 23. The first pressed surface 91 is applied with force when the outer ring 46 is press-fitted to the outer ring affixed portion 84. Furthermore, the inner ring 47 has the second pressed surface 92 on the side of the bottom portion 23. The second pressed surface 92 is applied with force simultaneously with the first pressed surface 91 when the outer ring 46 is press-fitted to the outer ring affixed portion 84. Therefore, the load working on the outer ring 46 and the inner ring 47 when the outer ring 46 is press-fitted into the outer ring affixed portion 84 can be restricted from working on the roller body 28. Therefore, the roller body 28 can be protected from damage. In addition, the inner ring 47 and the outer ring 46 are press-fitted to the same depth (level). Therefore, the movement of the rotor spindle 49 in the axial direction can be restricted within the length half of the thrust backlash among the roller body 28, the inner ring 47, and the outer ring 46.

Furthermore, according to the first embodiment, the level of the second pressed surface 92 is substantially the same as the level of the first pressed surface 91 in the axial direction. Therefore, when the outer ring 46 is press-fitted into the outer ring affixed portion 84, the press-fitting punch 90 is enabled to press the outer ring 46 and the inner ring 47 with its common surface. Therefore, the press-fitting punch 90 may have a simple shape having a flat press-fitting surface.

Furthermore, according to the first embodiment, the inner ring receiving portion 85 functions as an axial support of the inner ring 47 when the outer ring 46 is press-fitted to the outer ring affixed portion 84 and when the rotor spindle 49 is press-fitted to the inner ring 47. Therefore, the inner ring receiving portion 85, which is formed of a metallic material, is configured to receive the press-fitting load caused when the outer ring 46 is press-fitted to the outer ring affixed portion 84 and the press-fitting load caused when the rotor spindle 49 is press-fitted to the inner ring 47. Therefore, the rear housing 21 can be restricted from deforming due to the press-fitting load.

Second Embodiment

Figure 10:
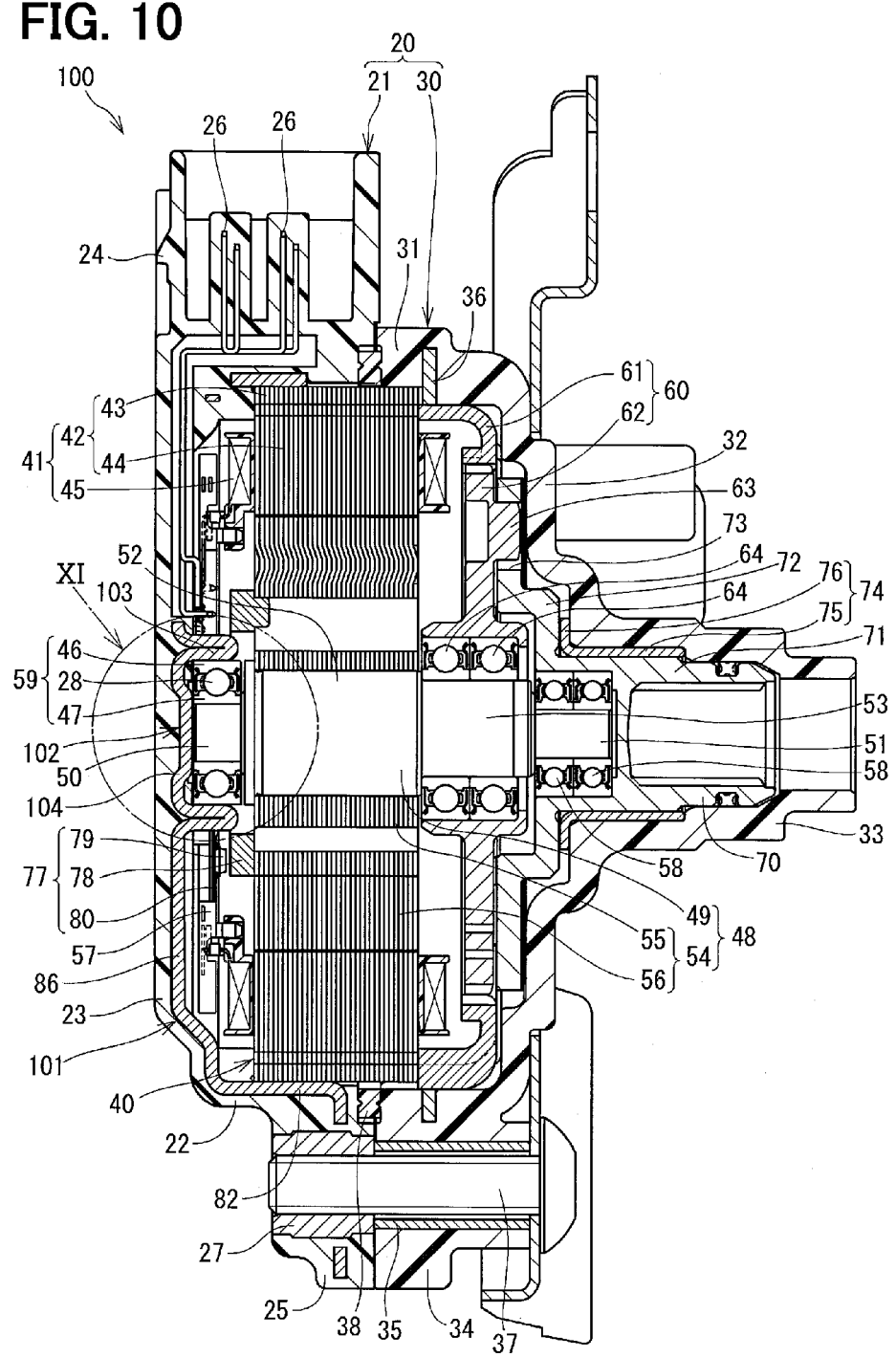
FIG. 10 is a sectional view showing a rotary actuator according to a second embodiment.
Figure 11:
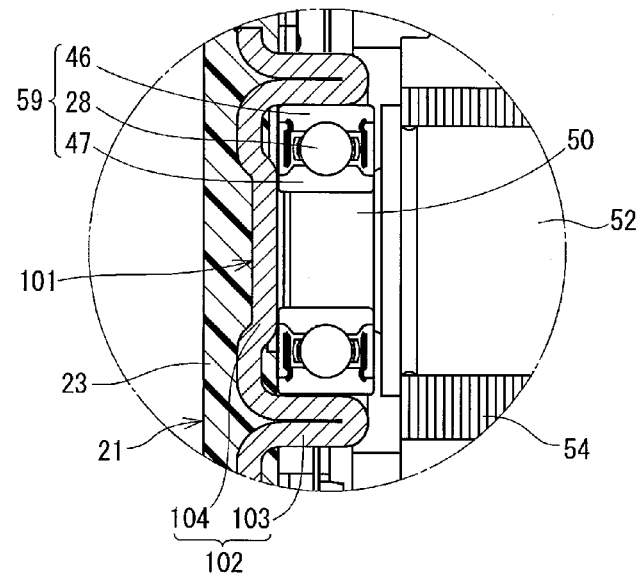
FIG. 11 is an enlarged view showing a section indicated by the circle XI in FIG. 10.
Figure 12:
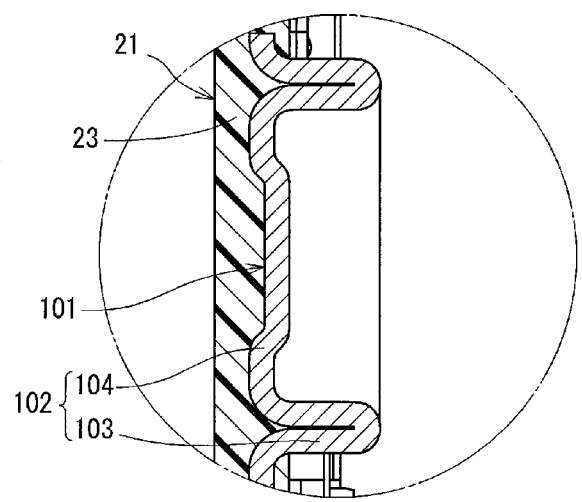
FIG. 12 is a sectional view showing the same portion of the rotary actuator as in FIG. 11, excluding a bearing.

Subsequently, a rotary actuator according to the second embodiment will be described with reference to FIGS. 10 to 12. A rotary actuator 100 according to the second embodiment includes a plate 101 having a bearing holder portion 102, which is different in shape from that of the first embodiment. The bearing holder portion 102 includes an outer ring affixed portion 103 and an inner ring receiving portion 104. The outer ring affixed portion 103 includes a tubular projection located at the radially outside of the outer ring 46 of the rear bearing 59. The tubular projection of the outer ring affixed portion 103 is projected from the joint unit 86 toward the rotor core 54. The bearing holder portion 102 includes the outer ring affixed portion 103 and the inner ring receiving portion 104.

The inner ring receiving portion 104 is located between the inner ring 47 and the bottom portion 23. The inner ring receiving portion 104 protrudes from the joint portion 86 toward the inner ring 47. The inner ring 47 is in contact with the inner ring receiving portion 104. The outer ring 46 and the bottom portion 23 have a gap therebetween. The inner ring receiving portion 104 functions as an axial support of the inner ring 47 when the outer ring 46 is press-fitted to the outer ring affixed portion 103 and when the rotor spindle 49 is press-fitted to the inner ring 47.

As described above, in the rotary actuator 100 according to the second embodiment, variation in the gap between the magnet 78 and the hall IC device 79 can be reduced, similarly to the rotary actuator 19. Therefore, the gap between the magnet 78 and the hall IC device 79 can be reduced, and the magnetism applied from the magnet 78 to the hall IC device 79 can be enhanced.

It is noted that, in the rotary actuator 100 of the second embodiment, movement of the rotor spindle 49 in the axial direction is restricted within the length of a minute thrust backlash caused among the components of the rear bearing 59, such as the roller body 28, the inner ring 47, and the outer ring 46, similarly to the rotary actuator 19 of the first embodiment. Therefore, the magnetism applied from the magnet 78 to the hall IC device 79 can be stabilized.

Other Embodiment

The rotor spindle is not limited to be affixed to the inner ring of the rear bearing by press-fitting. The rotor spindle may be integrally affixed by, for example, heating fit, cooling fit, welding, bonding, and/or the like. The outer ring of the rear bearing is not limited to be affixed to the outer ring affixed portion of the rear bearing by press-fitting. The outer ring may be integrally affixed by, for example, heating fit, cooling fit, welding, bonding, and/or the like. The bearing holder unit may be a separate component from the stator holder unit.

The bearing holder unit may be formed of a material such as a resin material other than a metallic material. The plate may be integrally joined to the rear housing by a method such as screwing a fastener other than insert molding. The outer ring affixed portion may include two projections or may include four or more projections.

The hall IC device may be a single element. The detection device may be a magnetic sensor other than the hall IC device. The rotary actuator may not include the encoder board. That is, the rotary encoder may be configured to send a pulse signal to an external device in synchronization with rotation of the rotor. The level of the second pressed surface may not be substantially the same as the level of the first pressed surface in the axial direction.

The housing may be divided into three or more components in the axial direction. The rotor of the motor is not limited to the inner rotor, which is located on the radially inside of the stator, and may be an outer rotor, which is located on the radially outside of the stator. The stator core may include multiple segmented stator cores, which are separated from each other and are provided to the teeth respectively.

The rotary actuator may be employed in a vehicular device other than the shift-by-wire system. The rotary actuator may not include reduction gears.

The above-described rotary actuator may include the rotor spindle, the rotor core, the stator, the housing, the magnet, the magnetic sensor, the bearing, and the bearing holder unit. The rotor spindle may be rotatable. The stator may be configured to generate a magnetism applied to the rotor core. The rotor core may be configured to receive the magnetism generated by the stator and to rotate integrally with the rotor spindle.

The housing may include the tubular portion, the first bottom portion, and the second bottom portion. The tubular portion may be located on the radially outside of the rotor core and the stator. The first bottom portion may surround one end of the tubular portion, and the second bottom portion may surround the other end of the tubular portion. The magnet may be affixed to the end of the rotor core on the side of the first bottom portion and may be rotatable integrally with the rotor core. The magnetic sensor may be affixed to the first bottom portion such that the magnetic sensor forms a gap with the magnet in the axial direction. The magnetic sensor may be configured to receive a magnetic field generated by the magnet and to send a pulse signal in synchronization with rotation of the rotor core.

The bearing may include the inner ring, the outer ring, and the roller body. The inner ring may be integrally affixed to the radially outer wall of the end of the rotor spindle on the side of the first bottom portion such that the inner ring is immovable relative to the rotor spindle in the axial direction. The outer ring may be located on the radially outside of the inner ring. The roller body may be located between the inner ring and the outer ring. The bearing may rotatably support the rotor spindle. The bearing holder unit may be integrally formed with the outer ring affixed portion and the inner ring receiving portion. The outer ring affixed portion may be integrally affixed to the radially outer wall of the outer ring such that the outer ring affixed portion is immovable relative to the outer ring in the axial direction. The inner ring receiving portion may be located between the inner ring and the first bottom portion and may be in contact with the inner ring. The bearing holder unit may be joined with the housing.

In the present configuration, variation in the gap between the magnet and the magnetic sensor coincides with accumulation of dimensional tolerances of (1) the axial dimension of the magnetic sensor, (2) the axial dimension between the magnetic sensor mount surface of the housing and the inner ring receiving surface of the inner ring receiving portion of the bearing holder unit, (3) the axial dimension of the inner ring of the bearing, (4) the axial dimension between the inner ring contact surface of the rotor spindle and the rotor core contact surface of the rotor spindle, and (5) the axial dimension of the magnet. Therefore, in the present configuration, the variation in the gap between the magnet and the magnetic sensor is smaller than the variation in the conventional configuration. Thus, the gap between the magnet and the magnetic sensor can be reduced, and the magnetism applied from the magnet to the magnetic sensor can be enhanced.

Furthermore, in the present configuration, the rotor spindle is movable in the axial direction by a minute thrust backlash among the roller body, the inner ring, and the outer ring in the bearing. Therefore, the magnetism applied from the magnet to the magnetic sensor can be stabilized. The rotary actuator may further include the stator holder unit, which is in a tubular shape and fitted to the radially outer wall of the stator, and the joint unit, which connects the bearing holder unit with the stator holder unit. In the present configuration, rigidity of the bearing holder unit can be enhanced.

The bearing holder unit, the stator holder unit, and the joint unit may be integrally formed of a metallic material and insert-molded of a resin material to be integrally joined with the housing. In the present configuration, the bearing holder unit can be easily joined with the housing. In addition, for example, when the outer ring is press-fitted to the outer ring affixed portion, the inner ring receiving portion, which is formed of a metallic material, can be caused to receive the load caused by the press-fitting. Therefore, the rear housing can be protected from deformation due to the press-fitting load.

The outer ring may form a gap on the side of the first bottom portion. The outer ring may be affixed to the outer ring affixed portion by press-fitting. In addition, the outer ring may have the first pressed surface, which is located on the side of the second bottom portion and pressed when being press-fitted. The inner ring may have the second pressed surface on the side of the second bottom portion. In addition, the first pressed surface and the second pressed surface may be pressed simultaneously when the outer ring is press-fitted to the outer ring affixed portion. In the present configuration, the load working on the outer ring and the inner ring when the outer ring is press-fitted into the outer ring affixed portion can be restricted from working on the roller body. Therefore, the roller body can be protected from damage. In addition, the inner ring and the outer ring are press-fitted to the same depth (level). Therefore, the movement of the rotor spindle in the axial direction can be restricted within the length half of the thrust backlash among the roller body, the inner ring, and the outer ring in the bearing.

The level of the first pressed surface in the axial direction may be substantially the same as the level of the second pressed surface in the axial direction. In this case, the press-fitting punch is enabled to press both the outer ring and the inner ring with the same surface when press-fitting the outer ring to the outer ring affixed portion. Therefore, the press-fitting punch may have a simple shape.

The rotor spindle may be affixed to the inner ring by press-fitting. In addition, the inner ring receiving portion may function as the axial support of the inner ring when the outer ring is press-fitted to the outer ring affixed portion and when the rotor spindle is press-fitted to the inner ring. In this case, the press-fitting load caused when the outer ring is press-fitted and the press-fitting load caused when the rotor spindle is press-fitted can be received with the inner ring receiving portion. Therefore, the rear housing can be protected from deformation due to the press-fitting load.

The above structures of the embodiments can be combined as appropriate. It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A rotary actuator comprising:
   a rotor spindle being rotatable;
   a rotor core being rotatable integrally with the rotor spindle;
   a stator configured to apply a magnetism to the rotor core to rotate the rotor core;
   a housing including
      a tubular portion located radially outside of the rotor core and the stator,
      a first bottom portion surrounding one end of the tubular portion, and
      a second bottom portion surrounding an other end of the tubular portion;
   a magnet affixed to an end of the rotor core on a side of the first bottom portion and rotatable integrally with the rotor core;
   a magnetic sensor affixed to the first bottom portion, such that the magnetic sensor forms a gap with the magnet in an axial direction, the magnetic sensor configured to receive a magnetic field caused by the magnet and to send a pulse signal in synchronization with rotation of the rotor core;
   a bearing configured to rotatably support the rotor spindle, the bearing including
      an inner ring integrally affixed to a radially outer wall of an end of the rotor spindle on the side of the first bottom portion such that the inner ring is immovable relative to the rotor spindle in the axial direction,
      an outer ring located radially outside of the inner ring, and
      a roller body located between the inner ring and the outer ring;
   a bearing holder unit joined to the housing;
   a stator holder unit fitted to the stator; and
   a joint unit connecting the bearing holder unit with the stator holder unit, wherein
   the bearing holder unit is integrally formed with
      an outer ring affixed portion integrally affixed to a radially outer wall of the outer ring such that the outer ring affixed portion is immovable relative to the outer ring in the axial direction, and
      an inner ring receiving portion located between the inner ring and the first bottom portion such that the inner ring receiving portion is in contact with the inner ring, the inner ring receiving portion protrudes from the joint unit toward the inner ring,
   the bearing holder unit, the stator holder unit, and the joint unit are integrally formed of a metallic material and are insert-molded of a resin material to be integrally joined with the housing, and
   the bearing holder unit other than the outer ring affixed portion is not in contact with the outer ring of the bearing.

2. The rotary actuator according to claim 1, wherein the stator holder unit is in a tubular shape and is fitted to a radially outer wall of the stator.

3. The rotary actuator according to claim 1, wherein
   the outer ring has a first pressed surface on a side of the second bottom portion, the outer ring being affixed to the outer ring affixed portion by press-fitting the outer ring via the first pressed surface such that the outer ring forms a gap with the first bottom portion, and
   the inner ring has a second pressed surface on the side of the second bottom portion, the first pressed surface and the second pressed surface are pressed simultaneously when the outer ring is press-fitted to the outer ring affixed portion.

4. The rotary actuator according to claim 3, wherein a level of the first pressed surface in the axial direction is substantially the same as a level of the second pressed surface in the axial direction.

5. The rotary actuator according to claim 4, wherein
   the rotor spindle is affixed to the inner ring by press-fitting, and
   the inner ring receiving portion functions as an axial support of the inner ring when the outer ring is press-fitted to the outer ring affixed portion and when the rotor spindle is press-fitted to the inner ring.

6. The rotary actuator according to claim 3, wherein
   the rotor spindle is affixed to the inner ring by press-fitting, and
   the inner ring receiving portion functions as an axial support of the inner ring when the outer ring is press-fitted to the outer ring affixed portion and when the rotor spindle is press-fitted to the inner ring.

7. The rotary actuator according to claim 1, wherein the outer ring affixed portion includes a plurality of projections projected from the joint unit toward the rotor core.

8. The rotary actuator according to claim 7, wherein
   the plurality of projections includes three projections, and
   each of the three projections is in a round shape extending along a radially outer surface of the outer ring.

9. The rotary actuator according to claim 1, wherein
   the joint unit is located around the inner ring receiving portion, and
   the joint unit is surrounded by resin, which forms the housing, on a side of the rotor core.

10. The rotary actuator according to claim 1, wherein the joint unit, the bearing holder unit, the stator holder unit, and the inner ring receiving portion are integrally formed of metal.

11. The rotary actuator according to claim 1, wherein
    the bearing holder unit is in contact with the inner ring of the bearing only at the inner ring receiving portion, and
    the bearing holder unit is in contact with the outer ring of the bearing only at the outer ring affixed portion.

12. The rotary actuator according to claim 1, wherein the inner ring receiving portion is bent and raised relative to the joint unit toward the inner ring of the bearing.

13. The rotary actuator according to claim 12, wherein the joint unit is distant from the outer ring of the bearing in an axial direction.

14. The rotary actuator according to claim 13, wherein the outer ring forms a gap with the joint unit in the axial direction.

15. The rotary actuator according to claim 1, wherein the outer ring affixed portion is bent relative to the joint unit and raised from the joint unit,
an aperture is adjacent to the outer ring affixed portion, and
the aperture is located between the outer ring affixed portion and the inner ring receiving portion.

16. The rotary actuator according to claim 1, wherein a portion of the housing, which is formed of a resin material, is located between the outer ring and the joint unit.

17. A rotary actuator comprising:
a rotor spindle being rotatable;
a rotor core being rotatable integrally with the rotor spindle;
a stator configured to apply a magnetism to the rotor core to rotate the rotor core;
a housing including
   a tubular portion located radially outside of the rotor core and the stator,
   a first bottom portion surrounding one end of the tubular portion, and
   a second bottom portion surrounding an other end of the tubular portion;
a magnet affixed to an end of the rotor core on a side of the first bottom portion and rotatable integrally with the rotor core;
a magnetic sensor affixed to the first bottom portion, such that the magnetic sensor forms a gap with the magnet in an axial direction, the magnetic sensor configured to receive a magnetic field caused by the magnet and to send a pulse signal in synchronization with rotation of the rotor core;
a bearing configured to rotatably support the rotor spindle, the bearing including
   an inner ring integrally affixed to a radially outer wall of an end of the rotor spindle on the side of the first bottom portion such that the inner ring is immovable relative to the rotor spindle in the axial direction,
   an outer ring located radially outside of the inner ring, and
   a roller body located between the inner ring and the outer ring;
a bearing holder unit joined to the housing;
a stator holder unit fitted to the stator; and
a joint unit connecting the bearing holder unit with the stator holder unit, wherein
the bearing holder unit is integrally formed with
   an outer ring affixed portion integrally affixed to a radially outer wall of the outer ring such that the outer ring affixed portion is immovable relative to the outer ring in the axial direction, and
   an inner ring receiving portion located between the inner ring and the first bottom portion such that the inner ring receiving portion is in contact with the inner ring,
the inner ring receiving portion protrudes from the joint unit toward the inner ring,
the bearing holder unit, the stator holder unit, and the joint unit are integrally formed of a metallic material and are insert-molded of a resin material to be integrally joined with the housing,
the inner ring receiving portion is bent and raised relative to the joint unit toward the inner ring of the bearing, and
the joint unit is distant from the outer ring of the bearing in an axial direction to form a gap with the outer ring in the axial direction.

18. A rotary actuator comprising:
a rotor spindle being rotatable;
a rotor core being rotatable integrally with the rotor spindle;
a stator configured to apply a magnetism to the rotor core to rotate the rotor core;
a housing including
   a tubular portion located radially outside of the rotor core and the stator,
   a first bottom portion surrounding one end of the tubular portion, and
   a second bottom portion surrounding an other end of the tubular portion;
a magnet affixed to an end of the rotor core on a side of the first bottom portion and rotatable integrally with the rotor core;
a magnetic sensor affixed to the first bottom portion, such that the magnetic sensor forms a gap with the magnet in an axial direction, the magnetic sensor configured to receive a magnetic field caused by the magnet and to send a pulse signal in synchronization with rotation of the rotor core;
a bearing configured to rotatably support the rotor spindle, the bearing including
   an inner ring integrally affixed to a radially outer wall of an end of the rotor spindle on the side of the first bottom portion such that the inner ring is immovable relative to the rotor spindle in the axial direction,
   an outer ring located radially outside of the inner ring, and
   a roller body located between the inner ring and the outer ring;
a bearing holder unit joined to the housing;
a stator holder unit fitted to the stator; and
a joint unit connecting the bearing holder unit with the stator holder unit, wherein
the bearing holder unit is integrally formed with
   an outer ring affixed portion integrally affixed to a radially outer wall of the outer ring such that the outer ring affixed portion is immovable relative to the outer ring in the axial direction, and
   an inner ring receiving portion located between the inner ring and the first bottom portion such that the inner ring receiving portion is in contact with the inner ring,
the inner ring receiving portion protrudes from the joint unit toward the inner ring, and
the bearing holder unit, the stator holder unit, and the joint unit are integrally formed of a metallic material and are insert-molded of a resin material to be integrally joined with the housing.

19. The rotary actuator according to claim 18, wherein
the inner ring receiving portion is bent and raised relative to the joint unit toward the inner ring of the bearing,
the outer ring affixed portion is bent relative to the joint unit and raised from the joint unit,
an aperture is adjacent to the outer ring affixed portion,
the aperture is located between the outer ring affixed portion and the inner ring receiving portion,
the outer ring affixed portion is in a triangular shape, and
the aperture is in a triangular shape and is greater than the outer ring affixed portion.

* * * * *